Jan. 11, 1944.   R. MUNIZ ET AL   2,338,866
APPARATUS FOR DISCRIMINATING TELEMETRIC IMPULSES
Filed Oct. 15, 1942   2 Sheets-Sheet 1
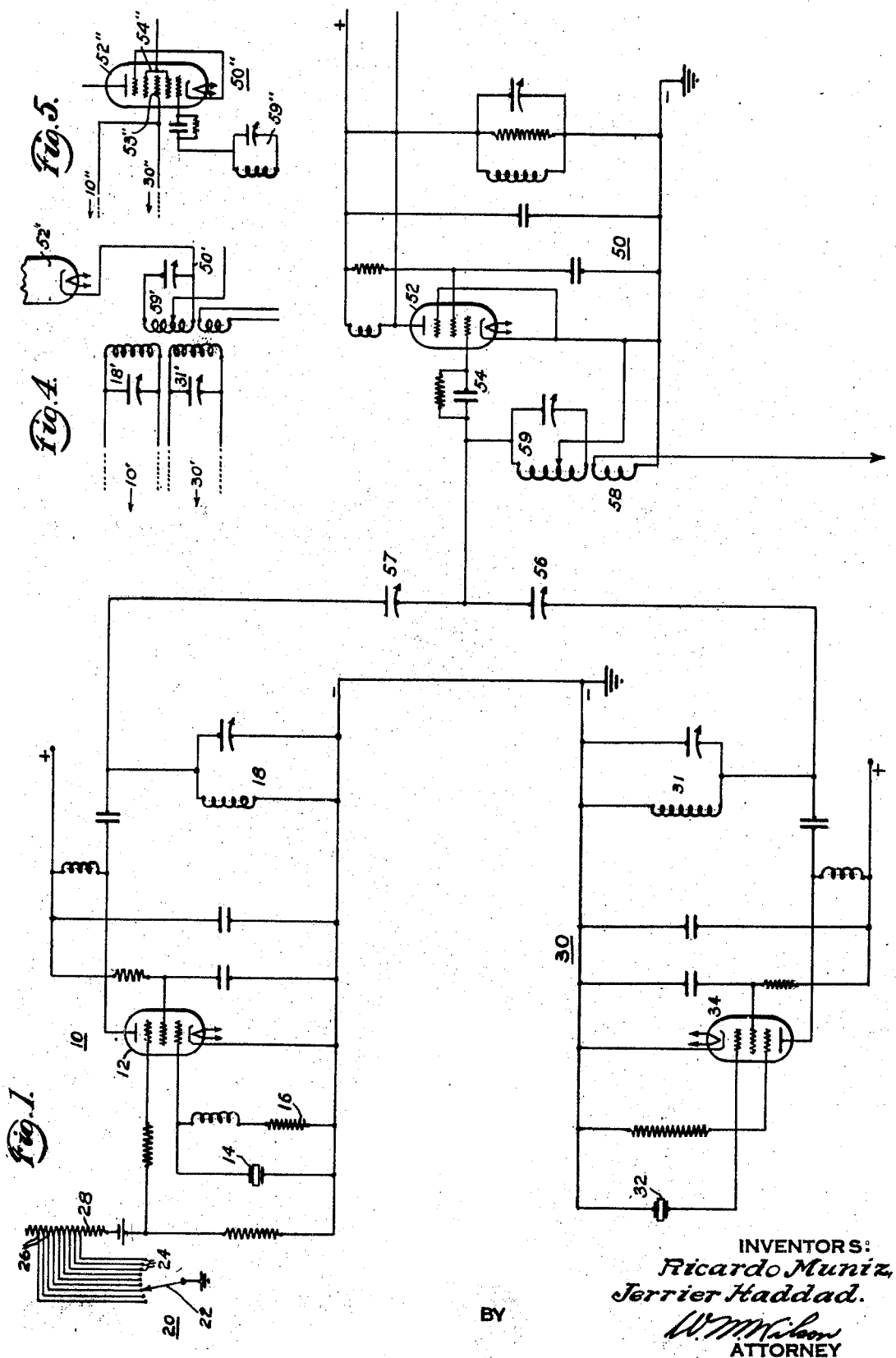
INVENTORS:
Ricardo Muniz,
Jerrier Haddad.
BY
ATTORNEY

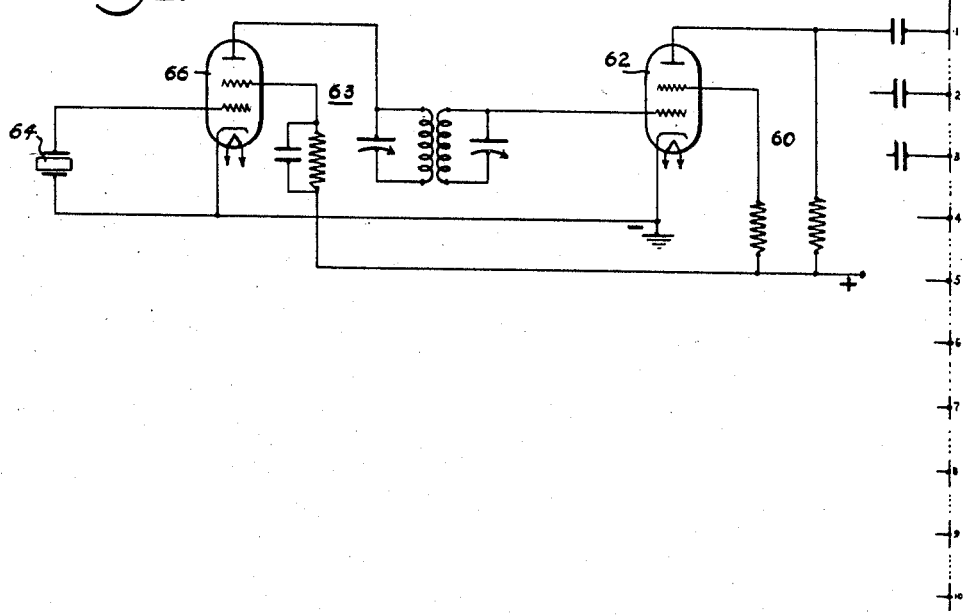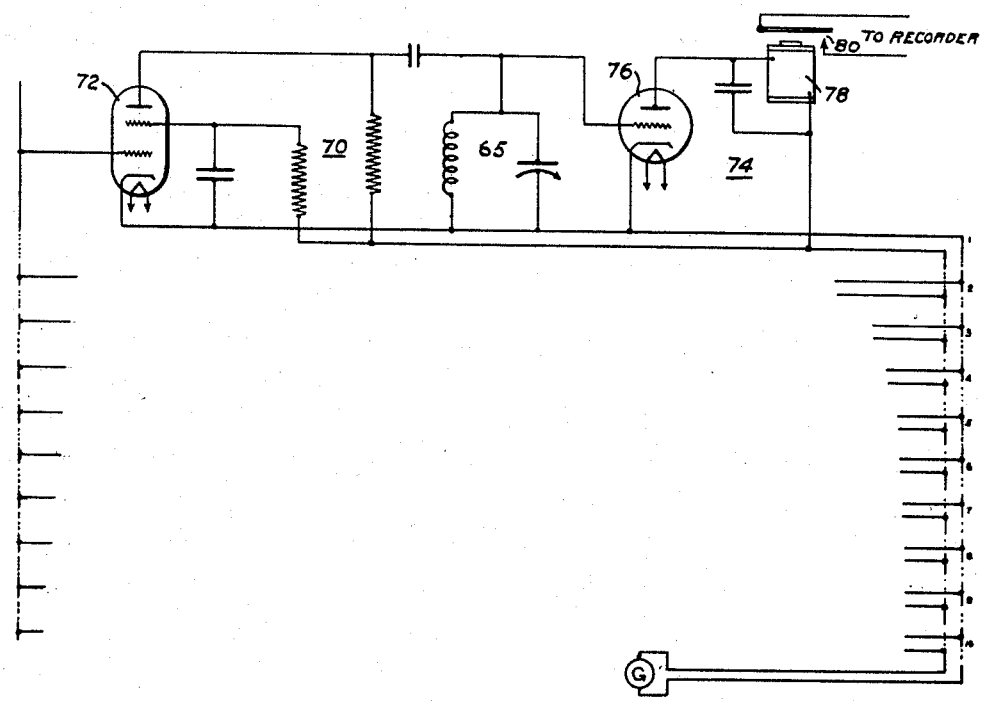

Patented Jan. 11, 1944

2,338,866

UNITED STATES PATENT OFFICE 2,338,866

APPARATUS FOR DISCRIMINATING TELEMETRIC IMPULSES

Ricardo Muniz and Jerrier Haddad, Brooklyn, N. Y., assignors to International Business Machines Corporation, New York, N. Y., a corporation of New York Application October 15, 1942, Serial No. 462,150

5 Claims. (Cl. 171—97)

The improved signal transmitting apparatus and method comprising the present invention has been designed primarily for use in connection with metering systems of the type ordinarily employed for indicating or registering the volume consumption of a metered commodity, which may, for example, be electricity, gas, water and the like. The invention in its broadest aspect, however, is capable of other uses and the same may be employed wherever a physical responsive effect is produced in accordance with an initiating change and has particular reference in this broad sense to an apparatus whereby a counter is actuated, a pointer is positioned, a recording is made or some other mechanism is actuated in accordance with the physical movement of a member, which may be, for example, a meter dial pointer or cyclometer wheel, a liquid level gauge or the like.

Heretofore, various methods have been devised for relaying signaling impulses to a central station which are indicative of the position of a movable member located at a remote point and for discriminating between these impulses at the central station in order that the position of the movable member may be determined and a suitable indication or recording made thereof. These various methods may all be broadly classified on the basis of the translating means employed for sending the telemetering signal from the remote point to the central station and include the transmission of varying voltage impulses; the transmission of varying frequency impulses; the transmission of impulses at a different rate of transmission, and the transmission of controlling impulses whereby synchronization occurs at the central station. The present invention is primarily concerned with the first of these methods, namely, the transmission of varying voltage impulses, and relates to a method of discriminating at the central station between the various transmitted voltage impulses to produce character-at-a-time differentiation wherein the net result of such discrimination may be expressed in terms of whole quantities or units, as, for example, digits of the Arabic numeral system, such character-at-a-time differentiation being distinguished from continuous differentiation where the result of discrimination is expressed over a wide range of incrementally increasing values.

This method of telemetering wherein varying voltage impulses are sent to the central station, particularly where the readings of a watt-hour meter are concerned, usually consists in introducing into a main reading channel or circuit varying values of resistance which are correlated with the volume consumption of the metered product and then measuring at the central station the value of the over-all channel or line resistance as determined by the voltage drop existing across a resistor placed in series with the introduced resistances. Various methods of discrimination have heretofore been employed for utilizing the voltage drop across the resistor to produce character-at-a-time readings and most of these have employed a series of marginally controlled relays whose circuits are adapted to be selectively closed to produce the various character readings and the present invention is no exception in this regard. However, these methods have invariably been of a marginal amplitude control type and various limitations are attendant thereupon. Principal among these is the lack of sensitivity and sharpness of control, as, for example, where the supplied voltage falls at or near a marginal differentiation value for adjacent relays in the system. Under such circumstances, unless the relays are very carefully set, indiscriminate actuation thereof may result and, where the hundreds or thousands digit of a meter reading is concerned, the error may represent an erroneous reading of considerable proportions.

The present invention is designed to overcome the above noted limitations that are attendant upon the use of marginally controlled relays for discrimination purposes which are based upon amplitude variation, and toward this end contemplates the provision of a system of marginal relay control wherein frequency variation is the controlling factor for the various relays. By such an arrangement, a "notched" operation is made possible wherein the frequencies employed may be caused to go to definite and stable values well within the marginal range of the relays concerned so that sharp and positive operation of the system is attained.

Broadly, the principal object of the present invention is to provide a frequency control system and method wherein a fixed frequency oscillator is amplitude-modulated to cause a second and variable frequency oscillator to vary its frequency in accordance therewith. More specifically, it is an object of the invention to provide a frequency control system of the character set forth above wherein the amplitude of oscillations produced by one oscillator may be modulated to produce frequency modulation of a second electron-coupled oscillator and the frequency modulated oscillator utilized to selectively close certain reading or signaling circuits in a telemetering system, thus resulting in a stability and selectivity of operation hitherto not possible in ordinary voltage varying methods of telemetering.

A further object is to provide such a system wherein the first amplitude-modulated oscillator is mutually coupled together with a second fixed frequency-fixed amplitude oscillator to the third electron-coupled oscillator whereby this latter oscillator is caused to be modulated as to frequency between specific limits, thus resulting in a greater stability of control than is made possible where a single controlling amplitude-modulated oscillator is employed for the purpose.

Yet another object is to augment the control of the third oscillator by a so-called "notched" system or series of parallel arranged oscillators, which serve to exert a pulling effect upon the third controlled oscillator to bring it to any one of a number of exact frequencies, depending upon the initial controlling effect of the first oscillator.

Still another object of the invention is to provide a frequency-modulated control system employing high "Q" tuned work circuits to produce greater stability of control than is possible in other methods of telemetering.

In carrying out the principles of the present invention, use is made of the fact that if two electron-coupled oscillators are loosely coupled to each other and are tuned to oscillate at frequencies which are not far apart, the two oscillators will tend to operate at a mean frequency which is dependent upon the relative strengths (i. e., the relative amplitudes of oscillation) of the two units. The amplitude of a fixed frequency oscillator may thus be varied to vary the "pulling" effect it has on another oscillator to which it is electronically coupled to vary the frequency of the latter.

According to the present invention, two crystal controlled oscillators designed for oscillation at different frequencies are mutually coupled to a third electron-coupled oscillator whose normal frequency is medially between the two frequencies of the control oscillators. Thus, depending upon the relative amplitudes of the oscillations generated by the first two oscillators (i. e., the relative strengths thereof), the frequency of the third oscillator will tend to shift toward the higher or lower frequency, whichever is of the greater amplitude. Means are provided for varying the amplitude and hence the strength of the first oscillation, according to the volume consumption of the metered product.

The output of the third and controlled oscillator is fed into ten buffer stages, the output circuits of which are in turn fed to ten power stages, preferably in the form of thyratron tube circuits, through respective parallel tuned circuits, which operate as selective filter stages. The thyratron tube circuits serve to control ten relays, which in turn operate to selectively close respective reading or recording circuits.

The third or controlled oscillator, which is controlled from the first two oscillators, is also controlled by a parallel arrangement of ten additional oscillators which are non-interacting and are isolated by buffer stages. These latter ten oscillators are crystal controlled and operate at frequencies which are the same as the resonant frequencies of the ten tuned filter circuits leading to the thyratron circuits. With such an arrangement, if the amplitude of the first oscillator is varied according to the volume consumption of the metered product, i. e., according to a particular meter reading, the relation between the amplitudes of the first and second oscillators will be changed and the frequency of the third or controlled oscillator will be shifted to approximately that of one of the tuned circuits leading to the thyratron circuits. This will bring the frequency of the controlled oscillator very close to the range of one of the group of ten controlling oscillators and this particular oscillator will exert a final pulling effect to bring the frequency of the third oscillator to an exact value, which will be the exact value of the desired tuned circuit through which it is desired to pass current to its respective thyratron tube and operate its respective relay and cause an Arabic numeral to be recorded.

By an arrangement of this character, numerous advantages are attained over the conventional method of telemetering wherein varying voltage impulses are discriminated at the central station. Among these is the fact that the system permits the use of very high "Q" tuned work circuits, which may be fairly close together and thus permit sharp discrimination between the varying voltage values in the reading circuit. These varying voltage values may be affected by numerous factors, such as temperature and humidity and age effects on the long reading line leading from the meter to the central station or on the resistors themselves, or by varying resistance effects introduced into the circuit by virtue of the numerous contacts in the field selectors or at the meters. By the present system, it is unnecessary to counteract these extraneous resistance factors by maintaining the voltage steps widely separated and the so-called "notched" operation of the parallel arrangement of control oscillators will serve to effectively "pull" the controlled oscillator to the desired frequency well within the narrower marginal limits of the system.

Other advantages of the invention not at this time enumerated will become apparent as the nature of the invention is better understood.

In the accompanying two sheets of drawings, one embodiment of the invention is shown and in these drawings:

Fig. 1 is a diagrammatic view of a pair of control oscillators and the oscillator controlled thereby, the disclosure being a fragmentary portion of the entire telemetering system.

Fig. 2 is a diagrammatic view of a group of control oscillators and corresponding buffer stages therefor.

Fig. 3 is a diagrammatic view of a series of controlled thyratron relay circuits and corresponding buffer stages therefor.

Fig. 4 is a fragmentary diagrammatic view showing an inductive method of coupling the two controlling oscillators to the controlled oscillator.

Fig. 5 is a fragmentary diagrammatic view similar to Fig. 4 showing an electronic method of coupling the two controlling oscillators to the controlled oscillator.

In all of the above described views, like characters of reference are employed to designate like parts throughout.

Referring now to the drawings in detail, and in particular to Fig. 1, a variable-amplitude, constant-frequency control oscillator is designated in its entirety at 10, and includes a pentode tube 12 having a crystal 14 disposed in its grid circuit. A resistor 16 provides the correct bias for the tube. A plate tank circuit 18, including a condenser and coil combination, has the effect of feeding back to the grid circuit through the grid-to-plate capacity of the tube, a voltage which is in phase with the crystal voltage and which, therefore, serves to maintain the vibrations of the crystal. The condenser in the tank circuit 18 may be adjusted to render the circuit inductive and the oscillator will operate at its maximum efficiency when the tank circuit is tuned to a frequency slightly higher than the resonant frequency of the crystal.

Means are provided for varying the amplitude of the oscillations generated by the oscillator 12 in accordance with the indication of a meter 20, which may be a watt-hour meter and which, therefore, indicates the volume consumption of electric current in watt-hours. Toward this end, the actual meter dial pointer 22 is adapted to successively engage a plurality of contacts 24, each of which is connected to a different tap point 26 on a resistor 28 to successively introduce varying values or increments of the resistor into the suppressor grid circuit of the tube 12 and thus vary the amplitude of oscillation of the tube while maintaining a constant frequency. It is obvious that the meter pointer 22 is controlled by a suitable stepping device (not shown) but the principles of the invention are susceptible to modification and the pointer 22 may, if desired, comprise an element of a simple rheostat whereby the increments of resistance successively introducer into the suppressor grid circuit of the tube 12 are infinitesimal and the resistance of this circuit builds up gradually.

A second stabilizing oscillator of the constant amplitude-constant frequency type is designated in its entirety at 30 and is substantially identical with the oscillator 10, with the exception that the crystal 32 is directly connected in the control grid circuit and constitutes the sole control means of determining the frequency of oscillation of the tube 34. The tank circuit of this latter oscillator is shown at 31. The frequency of oscillation of the oscillator 30 is somewhat less than the normal frequency of oscillation of the oscillator 10 and the two oscillators are mutually coupled to an electron-coupled oscillator which is designated in its entirety at 50, the oscillations of which it is desired to accurately control for the purpose of operating certain relay circuits, which will be described presently.

The oscillator 50 is more or less of conventional design and includes a tube 52 having a grid which is connected through a low reactance condenser 54, which also serves to smooth rectified grid current, to a point located between two adjustable coupling condensers 56 and 57 in the plate circuits of the tubes 12 and 34. The tank circuit 59, which is located in the grid circuit and by means of which the frequency of the oscillator is controlled, has inductively coupled thereto a coil 58 and by means of this latter coil the output circuits of ten buffer stages 60, see Fig. 2, including tubes 62 arranged in parallel relationship, are coupled to the oscillator 50 for auxiliary control thereof. The various buffer stages are each inductively coupled to preceding crystal controlled oscillators 63 having crystals 64 and tubes 66 and the various crystals 64 are of such character that the various oscillators controlled thereby will oscillate at spaced marginal stepped frequencies, which are of such values as to closely approach the frequencies capable of being independently assumed by the oscillator 50 under the control of the oscillators 10 and 30. The oscillators 63 are designed to exert a "pulling" effect on the oscillator 50 so that whenever this latter oscillator is brought to a frequency approximating that of one of the oscillators 63, the particular oscillator 63 will cause the oscillator 50 to oscillate at the exact frequency of the controlling crystal 64.

Referring now to Fig. 3, the output of the oscillator 50 is fed to a series of buffer stages 70, including tubes 72, corresponding in number to the number of crystal controlled auxiliary oscillators 63, and from thence through parallel tuned circuits 65 to an equal number of thyratron circuits 74, including thyratron tubes 76, each having a relay solenoid or magnet 78 in its output circuit. The circuits 65 have respective resonant frequencies which closely approximate the frequencies capable of being produced by the oscillator 50. The relay solenoids 78 are thus marginally biased or adjusted for different frequencies and each serves to control the opening and closing of a respective signaling circuit, by means of a normally open switch 80, the closing of which may serve to operate suitable indicating or recording mechanism at the central station where it is desired to take the resistance reading which is representative of the indication of the meter 20.

The thyratron tubes are essentially supplied with alternating current plate voltage, as indicated by the generator G, and thus these tubes and their respective solenoids will become de-energized immediately after discrimination has taken place.

Since the indication of the meter 20 is ordinarily expressed in terms of the ten Arabic numerals, it is obvious that ten auxiliary control oscillators, each with its respective buffer stage, and likewise ten relay circuits each controlling the opening and closing of a reading circuit, will be employed.

It should be noted that by virtue of the various buffer stages 72, associated with the tuned circuits 65, these latter circuits are effectively isolated from one another so that their capacitance and inductance effects are not mutually coupled and each circuit will be isolated from the others so that proper marginal biasing may become effective.

Referring now to Fig. 4 wherein a different method of coupling the two control oscillators 10' and 30' to the controlled oscillator 50' is shown, the tank circuit 18' of the oscillator 10' and the tank circuit 31' of the oscillator 30' are inductively coupled to the tank circuit 59', which is located in the grid circuit of the tube 52'.

In Fig. 5 an electronic method of coupling is employed between the two oscillators 10" and 30" and the controlled oscillator 50". In this form of the invention, the tube 52" is in the form of a pentagrid mixer having an injectorgrid 53" which is shielded as at 54". The tank circuit 59", corresponding to the tank circuit 59 of Fig. 1, is disconnected from the mutual output of the oscillators 10" and 30", the output circuits of the oscillators 10" and 30" being directly connected to the injectorgrid 53". By this method of coupling, highly efficient frequency converter system devoid of frequency drift and degeneration is afforded. It will be understood that the mixing action of the two takes place at the grid 53" since this grid introduces the signals issuing from the oscillators 10" and 30" into the plate circuit of the tube 52" at this point.

The invention is not to be limited to the exact circuit arrangements shown in the accompanying drawings or described in this specification as various changes may be made therein without departing from the spirit of the invention. For example, while the various tubes 76, see Fig. 3, have been described as being of the thyratron type, it is obvious that other types of tubes may be employed if desired. Also, it is obvious that other forms of coupling than those illustrated in the drawings may be resorted to as desired. Only insofar as the invention has been pointed out in the accompanying claims is the same to be limited.

What is claimed is:

1. In an apparatus for discriminating against the transmission of voltage impulses of certain amplitudes in favor of the transmission of voltage impulses of slightly higher and lower amplitudes, a plurality of normally open circuits, a circuit closing device for each circuit, a magnet for actuating each device, a frequency-responsive electronic tube operatively connected to each magnet for actuating the same, means of selectively biasing said tubes for operation at varying frequencies, an electron-coupled oscillator for applying varying frequency impulses to said electronic tubes, a variable amplitude-constant frequency oscillator coupled to the input of said first mentioned oscillator, and means for applying said voltage impulses to the input of said constant frequency oscillator to vary the amplitude thereof.

2. In an apparatus for discriminating against the transmission of voltage impulses of certain amplitudes in favor of the transmission of voltage impulses of slightly higher and lower amplitudes, a plurality of normally open circuits, a circuit closing device for each circuit, a magnet for actuating each device, a frequency-responsive electronic tube operatively connected to each magnet for actuating the same, means of selectively biasing said tubes for operation at varying frequencies, an electron-coupled oscillator for applying varying frequency impulses to said electronic tubes, a variable amplitude-constant frequency oscillator capacitance coupled to the input of said first mentioned oscillator, and means for applying said voltage impulses to the input of said constant frequency oscillator to vary the amplitude thereof.

3. In an apparatus for discriminating against the transmission of voltage impulses of certain amplitudes in favor of the transmission of voltage impulses of slightly higher and lower amplitudes, a plurality of normally open circuits, a circuit closing device for each circuit, a magnet for actuating each device, a frequency-responsive electronic tube operatively connected to each magnet for actuating the same, means of selectively biasing said tubes for operation at varying frequencies, an electron-coupled oscillator for applying varying frequency impulses to said electronic tubes, a pair of constant frequency oscillators mutually coupled to the input of said first mentioned oscillator, and means for applying said voltage impulses to the input of one of said constant frequency oscillators to vary the amplitude thereof.

4. In an apparatus for discriminating against the transmission of voltage impulses of certain amplitudes in favor of the transmission of voltage impulses of slightly higher and lower amplitudes, a plurality of normally open circuits, a circuit closing device for each circuit, a magnet for actuating each device, a frequency-responsive electronic tube operatively connected to each magnet for actuating the same, means of selectively biasing said tubes for operation at varying frequencies, an electron-coupled oscillator for applying varying frequency impulses to said electronic tubes, a pair of constant frequency oscillators mutually coupled to the input of said first mentioned oscillator, means for applying said voltage impulses to the input of one of said constant frequency oscillators to vary the amplitude thereof, a series of crystal controlled oscillators having natural frequencies which are marginally separated within the range of control exerted by the mutually coupled oscillators on the electron-coupled oscillator, said series of crystal controlled oscillators being coupled to said electron-coupled oscillator.

5. In an apparatus for discriminating against the transmission of voltage impulses of certain amplitudes in favor of the transmission of voltage impulses of slightly higher and lower amplitudes, a plurality of normally open circuits, a circuit closing device for each circuit, a magnet for actuating each device, a frequency-responsive electronic tube operatively connected to each magnet for actuating the same, means of selectively biasing said tubes for operation at varying frequencies, an electron-coupled oscillator for applying varying frequency impulses to said electronic tubes, a pair of constant frequency oscillators mutually coupled to the input of said first mentioned oscillator, means for applying said voltage impulses to the input of one of said constant frequency oscillators to vary the amplitude thereof, a series of crystal controlled oscillators having natural frequencies which are marginally separated within the range of control exerted by the mutually coupled oscillators on the electron-coupled oscillator, said series of crystal controlled oscillators being inductively coupled to said electron-coupled oscillator.

RICARDO MUNIZ.
JERRIER HADDAD.